US005607169A

United States Patent [19]

Sakurai et al.

[11] Patent Number: 5,607,169

[45] Date of Patent: Mar. 4, 1997

[54] SEALING ASSEMBLY FOR CONNECTOR HAVING DEFORMATION COMPENSATING SHAPE

[75] Inventors: Toshikazu Sakurai; Atsushi Sakatani, both of Yokkaichi, Japan

[73] Assignee: Sumitomo Wiring Systems, Ltd., Japan

[21] Appl. No.: 516,013

[22] Filed: Aug. 16, 1995

[30] Foreign Application Priority Data

Sep. 27, 1994 [JP] Japan .................................... 6-258919

[51] Int. Cl.$^{6}$ ........................................ F16J 15/10

[52] U.S. Cl. ....................... 277/168; 277/207 R; 439/559

[58] Field of Search .................................. 277/178, 208, 277/168, 170, 207 R, 235 B; 439/559, 556, 548, 364

[56] References Cited

U.S. PATENT DOCUMENTS

| | | | |
|---|---|---|---|
| 3,753,212 | 8/1973 | Yamada et al. | 439/556 |
| 3,837,657 | 9/1974 | Farnam et al. | 277/1 |
| 3,913,927 | 10/1975 | Gordon | 277/168 |
| 4,688,809 | 8/1987 | Deppe | 277/235 B |
| 4,861,282 | 8/1989 | Kobayashi et al. | 439/559 |
| 5,090,713 | 2/1992 | Johnson | 277/207 A |

FOREIGN PATENT DOCUMENTS

| | | | |
|---|---|---|---|
| 152151 | 9/1983 | Japan | 277/235 B |
| 138439 | 6/1991 | Japan | 277/235 B |
| 190232 | 7/1993 | Japan . | |

*Primary Examiner*—Scott Cummings
*Attorney, Agent, or Firm*—Bierman and Muserlian

[57] ABSTRACT

A sealing assembly for sealing two surfaces of two elements by a seal member between the two surfaces, wherein the two elements are pressed against each other by a coupling means acting between them and applying a bending moment to at least one of the two elements such that the corresponding surfaces are deformed, the seal member being of varying thicknesses over its length to compensate for the deformation. In an alternative aspect of the Invention, at least one of the two elements is shaped to achieve the compensation so that the sealing force is uniform. Thus, a reduction in the waterproofing function of the sealing assembly, which normally results from the deflection of the housing is prevented.

12 Claims, 7 Drawing Sheets

SEALING ASSEMBLY FOR CONNECTOR HAVING DEFORMATION COMPENSATING SHAPE

This Application claims the priority of Japanese Application 6-258919, filed Sep. 27, 1994.

The present Invention relates to a waterproof assembly for connecting a male housing and a female housing by a coupling member such as a nut and bolt combination.

BACKGROUND OF THE INVENTION

One example of known waterproof connectors is shown in FIG. 8. In assembling waterproof connector 1, male housing 4, containing unillustrated male terminal fittings, is fixed in mount hole 3 in panel 2 by an unillustrated mounting device so that the opening of receptacle 5 of male housing 4 corresponds to mount hole 3. Female housing 6, containing unillustrated female terminal fittings, is partially inserted into receptacle 5 through mount hole 3 from the side of panel 2 opposite male housing 4. At this stage, bolt 7, mounted on female housing 6, engages the internal threads of an unillustrated nut mounted on male housing 4. Tightening bolt 7 causes housing 6 to move closer to male housing 4, thereby engaging the male and female terminal fittings.

Seal member 8 is mounted on female housing 6 to prevent entry of water from female housing 6 to male housing 4 through mount hole 3 of panel 2. When housings 4 and 6 are brought into the desired assembled state, seal member 8 comes into close contact with the surface of panel 2 while undergoing elastic deformation. As a result, water entering between female housing 6 and mount hole 3 is generally prevented from further entering male housing 4.

When housings 4 and 6 are drawn closer to each other by tightening bolt 7 which cooperates with the nut (not shown), a force is generated which resists the approach of the radially inner portions of the housings. Accordingly, a portion of female housing 6 in the vicinity of bolt 7 is forcibly moved toward male housing 4 when bolt 7 is tightened. However, a bending moment greater than the rigidity of female housing 6 is created thereby and acts most strongly on the portions of housing 6 which are distant from bolt 7, thereby elastically deforming them. Therefore, female housing 6 becomes curved so that it is spaced further from panel 2 as it extends farther from bolt 7. Thus, the sealing force acting between seal member 8 and panel 2 becomes weaker in these areas. As a result, the ability of seal member 8 to prevent entry of water becomes impaired due to the foregoing nonuniformity. Hence, water is more likely to leak into the housings in these areas.

A method disclosed in Japanese Unexamined Utility Model Publication 4/69874 has been suggested to solve the foregoing problem. Specifically, four bolts are mounted at the respective corners of a terminal fitting mounting area. The bolts are turned together by a gear mechanism so that the entire housing is forcibly and uniformly moved closer to the mating housing. However, according to this method, the use of an increased number of bolts and the requirement of the gear mechanism lead not only to a larger size housing, but also to increased production costs due to the more complicated construction. This problem is found not only in waterproof connectors of the panel type, but also in waterproof connectors in which a seal member is directly mounted between a male housing and a female housing.

SUMMARY OF THE INVENTION

An object of the Invention is to maintain the ability of the seal member to prevent water entry, despite deflection of the housing, without the need for a large mechanism and additional bolts which would make the housing larger and increase production costs.

When the two elements are forced together by the coupling device, the surface of at least one element is deformed in a curved manner so that it is farther from the mating element at points more remote from the coupling device. Such deformation causes the seal member to be similarly deformed and curved. It is a feature of the Invention that the seal member and/or the elements are shaped so that the surface of the seal is in uniform contact with the surfaces to be sealed. In other words, the sealing force is substantially uniform over the entire sealing area. This is accomplished by making the curve of the seal member the reverse of the curve caused by the deformation. Accordingly, the configuration of the sealing surface of the seal member changes from a curve which is closer to the sealed surface as it extends farther from the coupling device, to a substantially flat surface which is parallel to the mating element, thereby creating a watertight seal. Further, according to the Invention, it is not necessary to provide means for restricting the bending (and deformation) of the element, thereby maintaining the housing smaller and reducing the production costs which would otherwise result from the use of a complicated mechanism.

Preferably, the curved shape of the sealing surface of the seal member is formed by making the seal member thicker as it extends away from the coupling means. Alternatively, the curved shape of the sealing surface is formed by keeping the thickness of the seal member constant, and by curving the element so that it urges the surface of the seal member into the desired curve.

In the accompanying drawings, constituting a part hereof and in which like reference characters indicate like parts, FIG. 1 is a cross-section of a first embodiment of the Invention which has been fully assembled;

Figure 1:
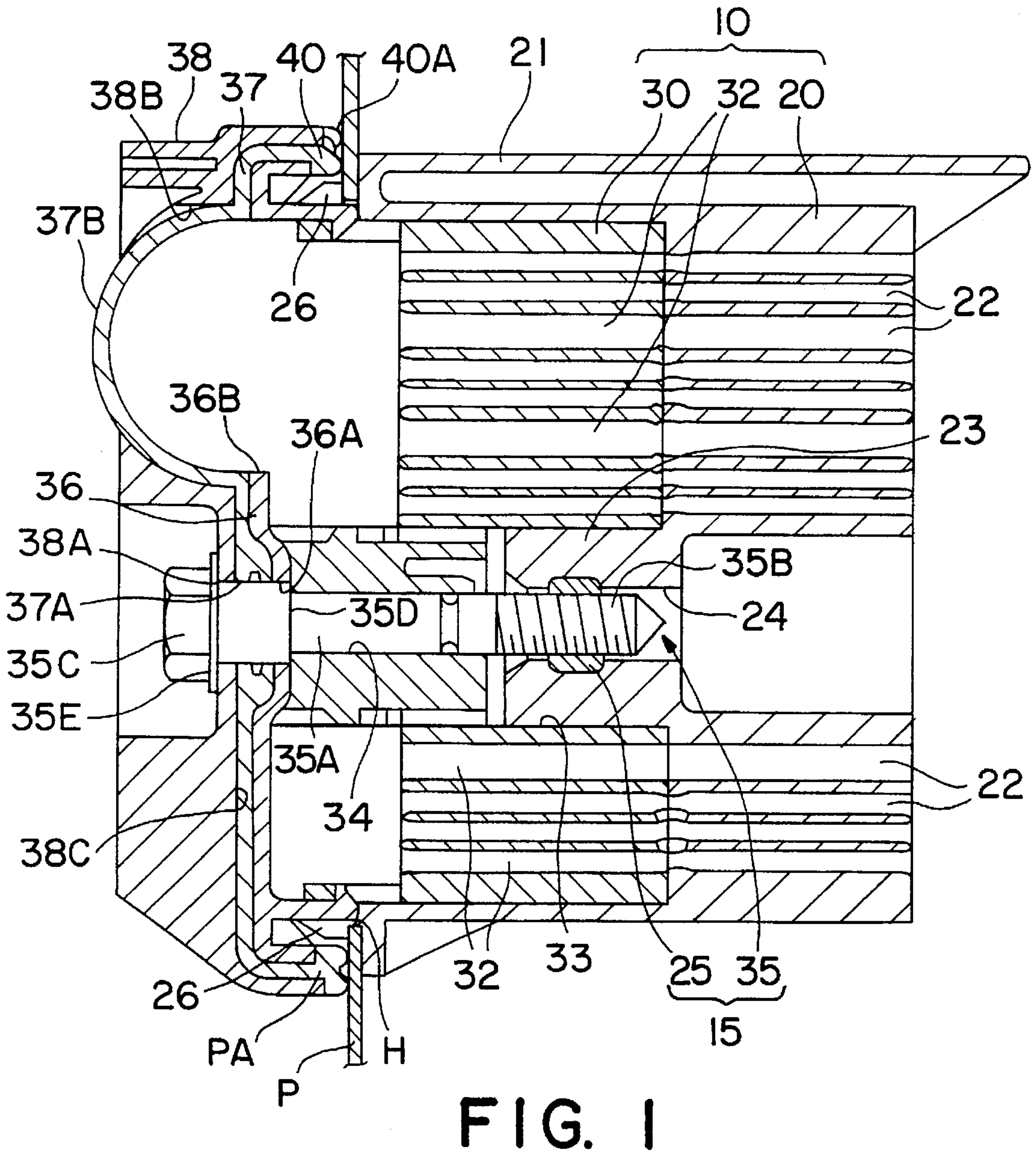

Referring to FIGS. 1 to 5, waterproof connector 10 is to be fixed on panel P, on which male housing 20 has been mounted in advance. Female housing 30 is to be mated to male housing 20.

Male housing 20 is preferably of synthetic resin, and usually has a rectangular front surface which is relatively long in the vertical direction. Receptacle 21 projects along the periphery of the front surface. Inside male housing 20, a plurality of cavities 22 for accommodating unillustrated male terminal fittings extends from the front surface of receptacle 21 to the rear surface. Cavities 22 are arranged one over another vertically except for a portion of housing 20 located slightly below the vertical center of the front surface.

Projection 23, projecting forward from the front surface of receptacle 21 where no cavities 22 are formed, has through hole 24 extending in the engaging direction of housings 20 and 30 (i.e., the lateral direction in FIG. 1). In through hole 24, nut 25, mounted from the lateral side of housing 20, is fixed so that it neither moves in the longitudinal axis direction nor rotates about the longitudinal axis.

Male housing 20 is secured on the right surface of panel P in FIG. 1 by engaging projections 26 at upper and lower edges of the opening of receptacle 21 which mate with mount hole H or panel P.

Female housing 30 is also preferably of synthetic resin, and has a relatively long rectangular cross-section in the vertical direction so that it can be fitted into receptacle 21. A plurality of cavities 32 for accommodating unillustrated female terminal fittings extends from the front surface of female housing 30 to the rear surface thereof. Cavities 32 are arranged one over another vertically except for the portion of housing 30 located slightly below the vertical center thereof.

Recess 33, engageable with the projection 23 of male housing 20, is on the front surface of female housing 30 where there are no cavities 32. In the bottom surface of recess 33, bolt hole 34, which is a through hole extending to the rear surface of female housing 30, is coaxial with nut 25. Bolt 35, which forms coupling member 15 together with nut 25, is inserted into bolt hole 34. External thread portion 35B, which engages nut 25, is at the leading end of shaft 35A of bolt 35. Shaft 35A is contiguous with head 35C, and pressing portion 35D is engageable with the rear opening edge of bolt hole 34 and has a larger diameter than shaft 35A, thereby forming a stepped portion at the boundary between pressing portion 35D and shaft 35A. Further, head 35C has washer 35E engageable from behind by grommet cover 38.

Grommet holder 36, having openings 36A and 36B corresponding to bolt hole 34 and cylindrical portion 37B of grommet 37, respectively, is mounted at the rear of female housing 30. Grommet 37, having opening 37A corresponding to bolt hole 34 is mounted on the outer surface of grommet holder 36 so that it covers the entire rear surface of housing 30. A bundle of unillustrated wires connected to the female terminal fittings extending backward of female housing 30 from cavities 32 are inserted into cylindrical portion 37B in grommet 37. Grommet cover 38 of metal and having openings 38A and 38B corresponding to bolt hole 34 and cylindrical portion 37B of grommet 37, respectively, is mounted at the outside of grommet 37.

Grommet 37 is of an elastically deformable material, and its periphery acts as seal portion 40 which is in sealable contact with left (rear) surface PA of panel P during assembly of housings 20 and 30. Seal portion 40 prevents entry of water from female housing 30 into male housing 20 through the clearance between mount hole H and female housing 30.

Figure 2:
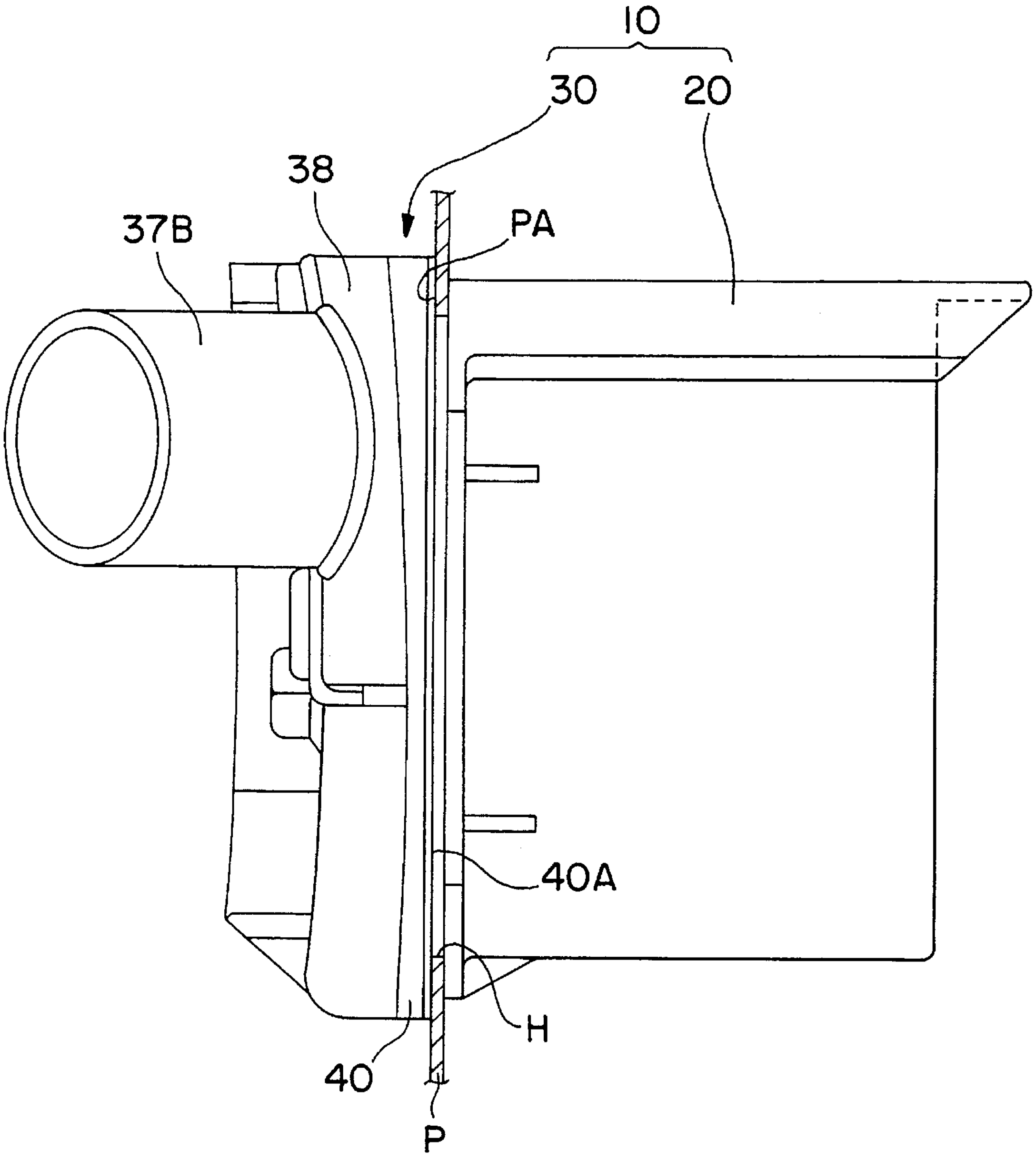
FIG. 2 is a side view of the embodiment of FIG. 1.
Figure 3B:
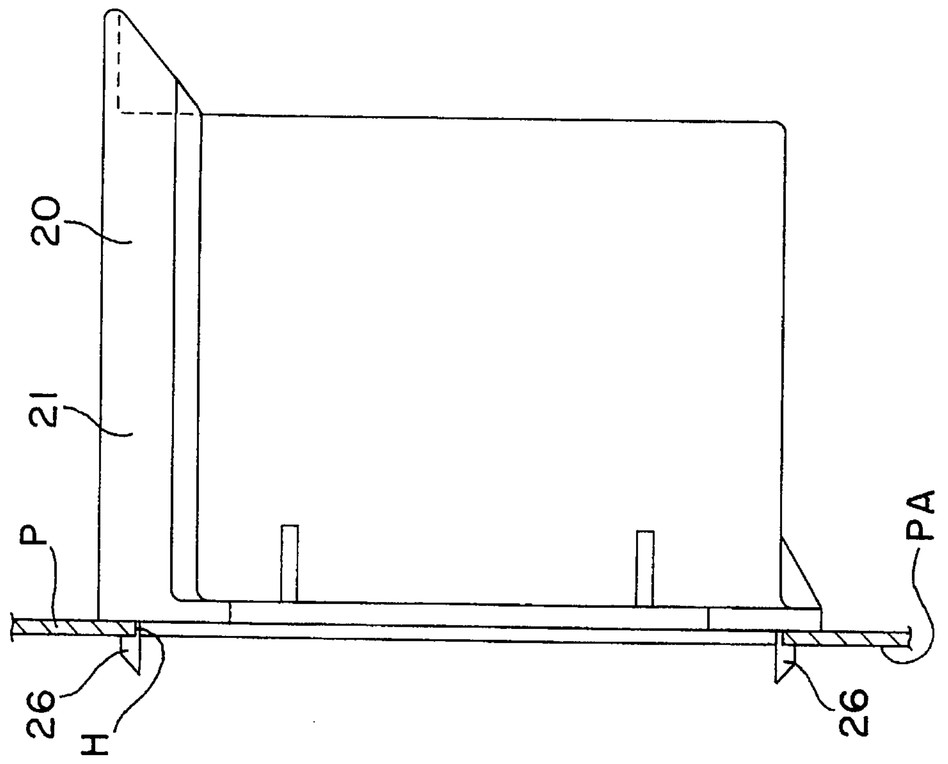
FIG. 3 is a side view of the female housing of FIG. 1 before assembly.
Figure 3A:
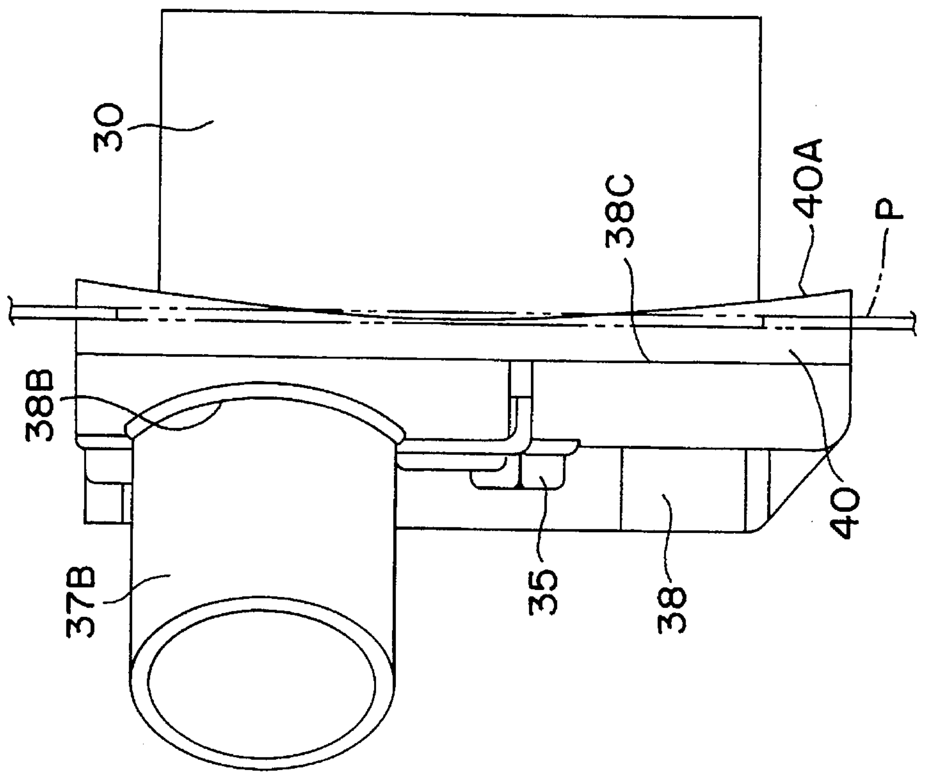
Figure 4:
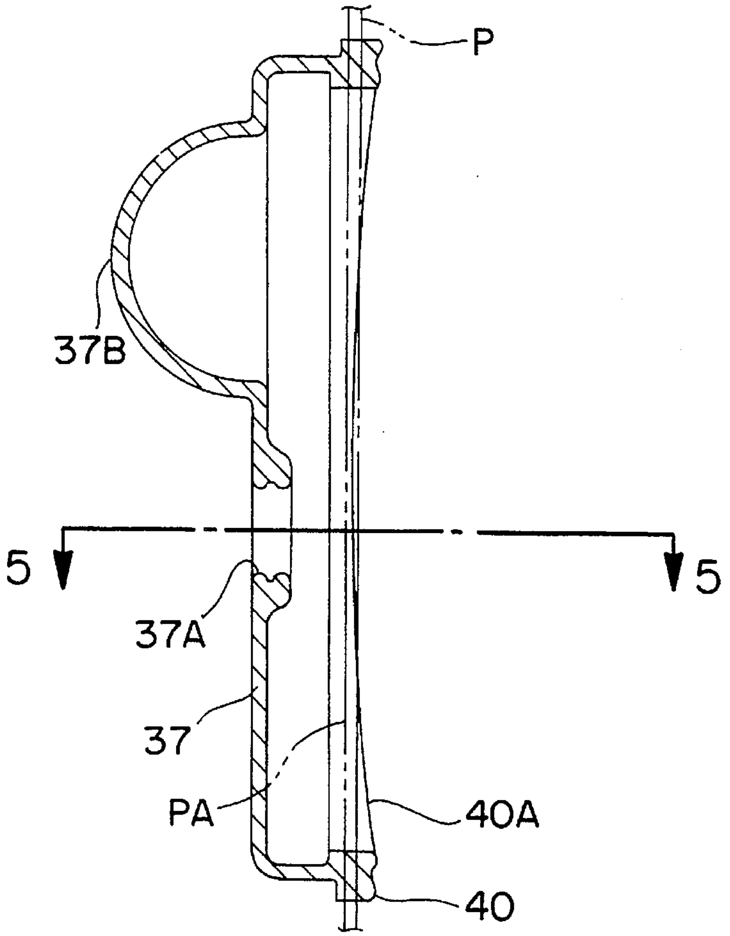
FIG. 4 is a cross-section showing the shape of the seal portion of the grommet of the first embodiment.
Figure 5:
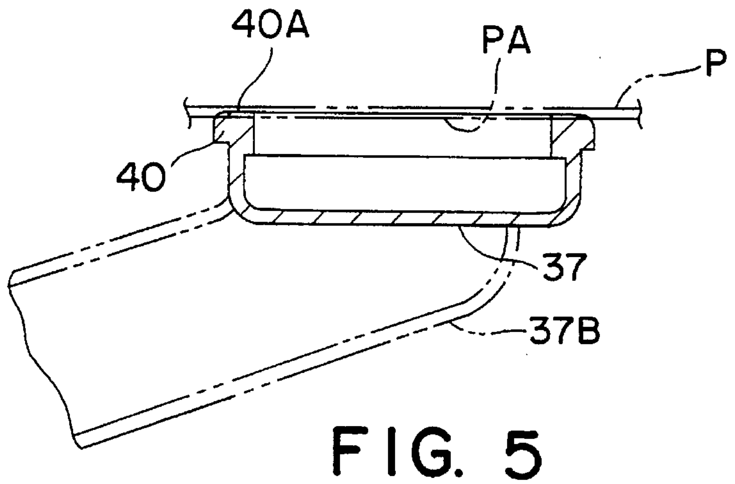
FIG. 5 is a section along 5—5 of FIG. 4.

As shown in FIGS. 2, 3, and 4, the lateral edge of seal portion 40 has a nonuniform thickness over its vertical length. Specifically, the thickness of seal portion 40 is smallest at and adjacent the position of bolt 35, and gradually increases as the seal portion extends farther upward and downward from this point.

When female housing 30 is fully secured to panel P and/or male housing 20, the rear surface of seal portion 40, having a variable thickness and as a result of coming into contact with grommet cover 38, is flat (the left surface in FIGS. 3 and 4), so that it is parallel to sealed surface PA of panel P. In FIG. 3, panel P is shown twice to illustrate this.

To install the device of the present Invention, grommet holder 36, grommet 37, and grommet cover 38 are assembled with male housing 20 which is first securely mounted on panel P. Female housing 30 is introduced into receptacle 21 and bolt 35 is inserted so that thread portion 35B engages nut 25. As bolt 35 is tightened, pressing portion 35D presses against the opening edge of bolt hole 34 to urge female housing 30 toward male housing 20. Washer 35E of head 35C presses against grommet cover 38 to compress grommet cover 38, grommet 37, and grommet holder 36 against male housing 20. When male and female housings 20 and 30 reach their final assembled position, where the male and female terminal fittings are properly engaged, the tightening of bolt 35 ceases, thereby completing the assembling operation.

During the above operation, there is resistance to the approach of housings 20 and 30, especially as to those portions which are vertically displaced from bolt 35. Since male housing 20 is secured to panel P, only female housing 30 is subjected to this resistance. However, the portion of female housing 30 close to bolt 35 is forcibly moved toward male housing 20 since the fastening force thereof acts directly thereon. While the portions of female housing 30 above and below bolt 35 are also moved toward male housing 20, due to a certain degree of rigidity of female housing 30, grommet holder 36, and grommet cover 38, they do not do so to the same extent as the portions close to bolt 35. Hence, a larger bending moment acts on such portions which are more distant from bolt 35, i.e., in positions closer to the upper and lower edges of female housing 30, thereby curving female housing 30 away from male housing 20.

When this happens, seal portion 40 is deformed and curved similarly. However, since seal surface 40A has the reverse of the curve of assembled female housing 30, sealing surface 40A flexes from the curved state, where it is closer to sealed surface PA toward its upper and lower edges, to a flat state, where it is substantially parallel to sealed surface PA. Thus, seal portion 40 is in uniform, strong, and close contact with sealed surface PA over its entire sealing surface 40A, with the result that entry of water from female housing 30 into male housing 20 through a clearance between mount hole H and female housing 30 is prevented. As is clear from the above description, sealing surface 40A of seal portion 40 has a curved shape, taking into consideration the fact that female housing 30 is caused to curve due to the resistance to engagement between the male and female terminal fittings. Accordingly, seal portion 40 exhibits a high water entry preventing ability when housings 20 and 30 are assembled in accordance with the present Invention.

Moreover, it is not necessary to provide means for preventing a deformation of female housing 30. On the contrary, the device of the present Invention is intended to function in conjunction with such deformation. Thus, unlike the waterproof connector provided with deformation preventing means, the connector of the Invention does not encounter the problems of increased size and production cost resulting from the use of the complicated mechanism of the prior art.

Figure 6:
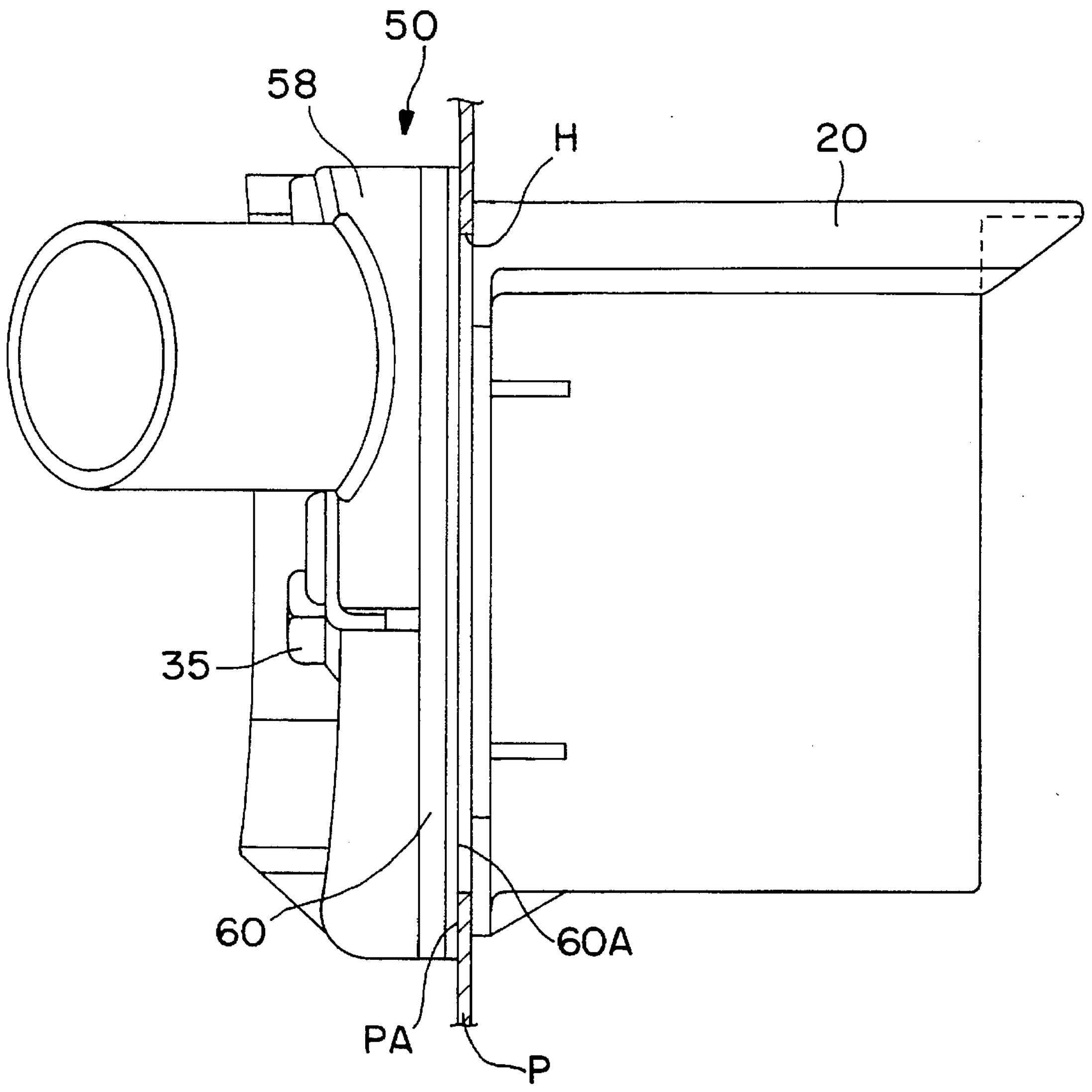
FIG. 6 is a view, similar to that of FIG. 1, showing a second embodiment of the Invention.
Figure 7B:
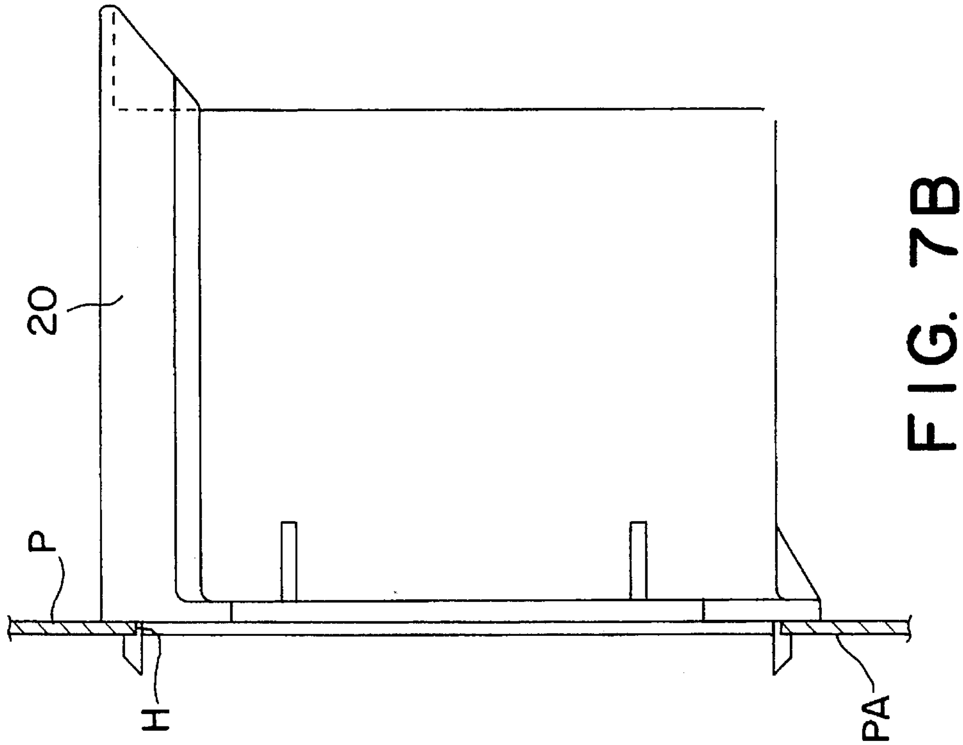
FIG. 7 is a side view of the female housing of FIG. 6.
Figure 7A:
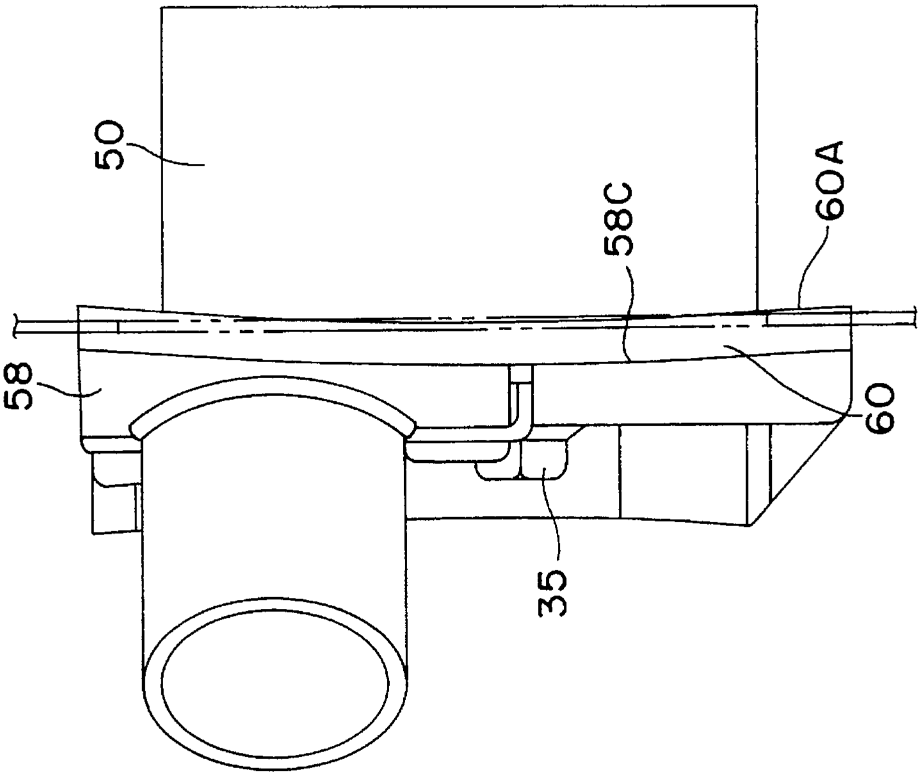
Figure 8:
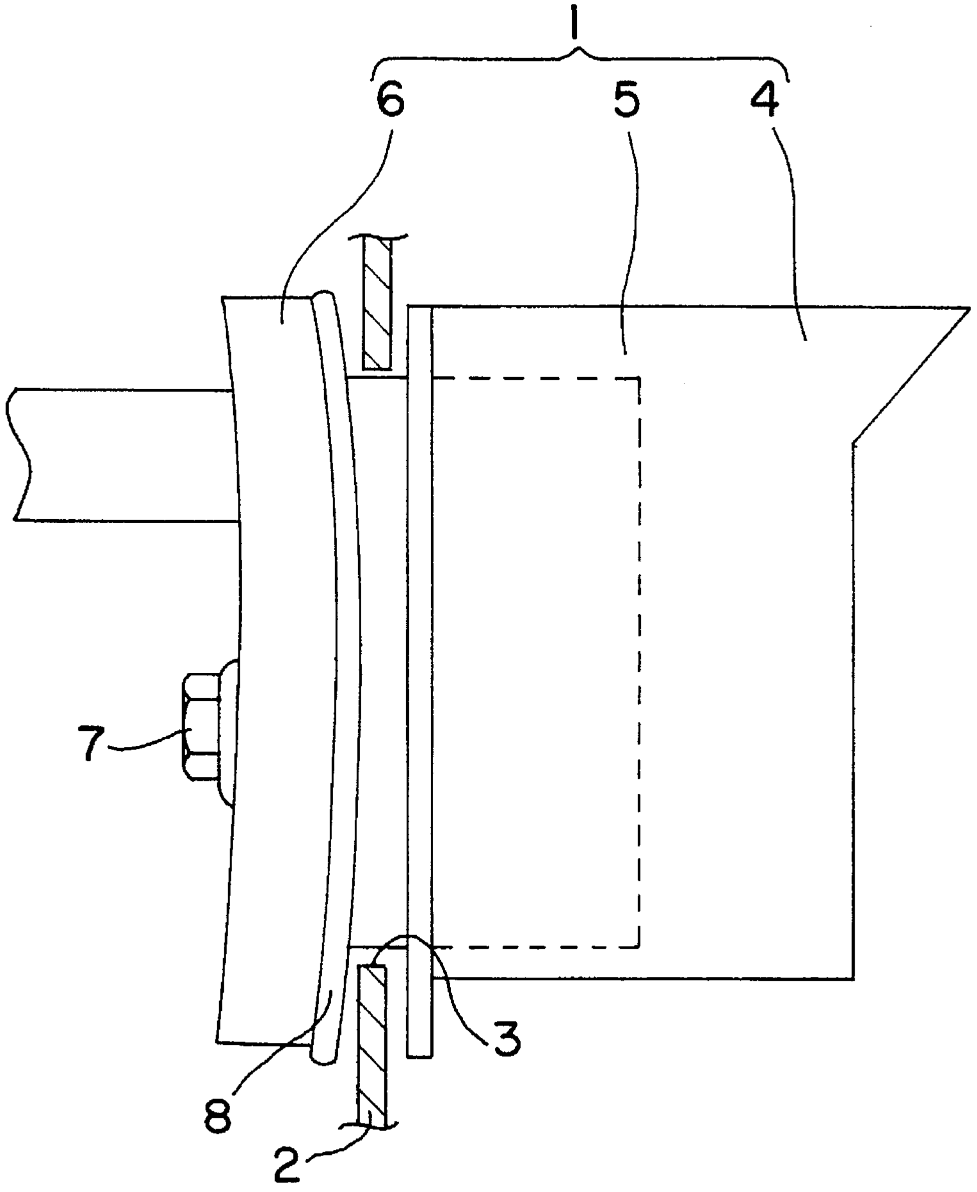
FIG. 8 PRIOR ART
FIG. 8 is a side view of a prior art connector.

Referring to FIGS. 6 and 7, the waterproof connector of the second embodiment differs from that of the first embodiment in the shape of the female housing and the seal portion. Since the remaining components are the same as in the first embodiment, no detailed description is given thereto with regard to the structure, operation, and effect thereof. Female housing 50 is provided with seal portion 60, which has a uniform thickness in the engaging direction of the housings, and is uniform in the vertical direction. The surface of grommet cover 58 in contact with the seal portion 60 has the curved shape that is closer to panel P as it extends toward its upper and lower edges from bolt 35. Accordingly, sealing surface 60A of seal portion 60 conforms to grommet cover 58 and exhibits the inventive curved shape which is closer to sealed surface PA in areas remote from bolt 35.

When female housing 50 is assembled with male housing 20 secured on panel P, sealing surface 60A goes from the curved state to a flat state where it is parallel to sealed surface PA. In this condition, sealing surface 60A closely contacts panel P while elastically deforming. Thus, entry of water from female housing 50 to male housing 20 through the clearance between mount hole H and female housing 30 is prevented.

The present Invention is not limited to the above described and illustrated embodiments and may be embodied in a variety of other forms. Since the housing has a vertically long shape when viewed from the front and the terminal fittings are arranged one over another in the vertical direction in the foregoing embodiments, the sealing surface of the seal portion is curved only in the vertical direction. However, if the housing has, for example, a square shape when viewed from the front and the terminal fittings are arranged laterally as well as vertically, the sealing surface may be curved, not only in the vertical direction, but also in the lateral direction. Then, the effectiveness of the seal portion is uniform over the entire sealing surface. Although the foregoing embodiments describe the use of only one bolt as the coupling member, the Invention is equally applicable if two or more bolts are provided.

The foregoing embodiments are described with respect to the case where the Invention is applied to waterproof connectors of the panel mount type, the Invention may nonetheless be applied to connectors wherein the seal portion is mounted between male and female housings which are in direct contact with each other.

These and other changes which would be obvious to the person of ordinary skill may be made without departing from the scope or spirit of the Invention. Thus, the Invention is to be broadly construed and not to be limited except by the character of the claims appended hereto.

What we claim is:

1. A waterproof sealing assembly comprising a first surface and a second surface with a seal therebetween, said first surface being pressed against said second surface in a coupling direction by a coupling device, thereby causing deformation of at least one of said first surface and said second surface, said deformation causing curvature thereof, said seal shaped to compensate for said curvature, said first surface is on a first element and said second surface is on said second element, said first element being a synthetic resin male portion of a waterproof connector and said second element being a synthetic resin female portion of said waterproof connector, said male portion and said female portion adapted to be sealingly coupled to each other.

2. The assembly of claim 1 wherein said first element and said second element are coupled by a nut and bolt.

3. The assembly of claim 1 wherein said male portion comprises a plate and said female portion includes a seal cover, said seal being between said plate and said seal cover.

4. The assembly of claim 1 wherein said seal is on one of said male portion and said female portion.

5. The assembly of claim 1 wherein said seal has a thickness in said coupling direction which remains substantially the same irrespective of its distance from said coupling device, which distance is perpendicular to said coupling direction, said first surface being on a first element and said second surface being on a second element, at least one of said first element and said second element being curved to compensate for said deformation.

6. The assembly of claim 2 wherein said nut and bolt are centrally located on said first surface and said second surface.

7. A waterproof sealing assembly comprising a first surface and a second surface with a seal therebetween, said first surface being pressed against said second surface in a coupling direction by a coupling device, thereby causing deformation of at least one of said first surface and said second surface, said deformation causing curvature thereof, said seal shaped to compensate for said curvature, said seal has a thickness in said coupling direction which increases with its distance from said coupling device in a direction which is perpendicular to said coupling direction and the said first surface is on a first element and said second surface is on said second element, said first element being a synthetic resin male portion of a waterproof connector and said second element being a synthetic resin female portion of said waterproof connector, said male portion and said female portion adapted to be sealingly coupled to each other.

8. The assembly of claim 7 wherein said male portion comprises a plate and said female portion includes a seal cover, said seal being between said plate and said seal cover.

9. The assembly of claim 7 wherein said seal has a thickness in said coupling direction which remains substantially the same irrespective of its distance from said coupling device, which distance is perpendicular to said coupling direction, said first surface being on a first element and said second surface being on a second element, at least one of said first element and said second element being curved to compensate for said deformation.

10. A waterproof sealing assembly comprising a first surface and a second surface with a seal therebetween, said first surface being pressed against said second surface in a coupling direction by a coupling device, thereby causing deformation of at least one of said first surface and said second surface, said deformation causing curvature thereof, said seal shaped providing uniform sealing force throughout said seal, said first surface is on a first element and said second surface is on said second element, said first element being a synthetic resin male portion of a waterproof connector and said second element being a synthetic resin female portion of said waterproof connector, said male portion and said female portion adapted to be sealingly coupled to each other.

11. The assembly of claim 10 wherein said male portion comprises a plate and said female portion includes a seal cover, said seal being between said plate and said seal cover.

12. The assembly of claim 10 wherein said seal has a thickness in said coupling direction which remains substantially the same irrespective of its distance from said coupling device, which distance is perpendicular to said coupling direction, said first surface being on a first element and said second surface being on a second element, at least one of said first element and said second element being curved to compensate for said deformation.

* * * * *